United States Patent
Magowan et al.

(10) Patent No.: US 11,947,660 B2
(45) Date of Patent: Apr. 2, 2024

(54) SECURING PODS IN A CONTAINER ORCHESTRATION ENVIRONMENT

(71) Applicant: International Business Machines Corporation, Armonk, NY (US)

(72) Inventors: James Robert Magowan, Surrey (GB); Angel Nunez Mencias, Stuttgart (DE); Stefan Liesche, Boeblingen (DE); Moriyoshi Ohara, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 17/446,478

(22) Filed: Aug. 31, 2021

(65) Prior Publication Data
US 2023/0068221 A1    Mar. 2, 2023

(51) Int. Cl.
G06F 21/00    (2013.01)
G06F 8/60    (2018.01)
G06F 21/53    (2013.01)
H04L 9/32    (2006.01)

(52) U.S. Cl.
CPC .............. *G06F 21/53* (2013.01); *G06F 8/60* (2013.01); *H04L 9/3247* (2013.01); *G06F 2221/033* (2013.01); *G06F 2221/2149* (2013.01)

(58) Field of Classification Search
None
See application file for complete search history.

(56) References Cited

U.S. PATENT DOCUMENTS

| 10,212,041 B1 | 2/2019 | Rastogi et al. |
| 11,080,410 B1 | 8/2021 | Sandall et al. |
| 2019/0020665 A1* | 1/2019 | Surcouf ............... H04L 9/3236 |

(Continued)

FOREIGN PATENT DOCUMENTS

| CN | 108737215 A | 11/2018 |
| CN | 109413065 A | 3/2019 |
| CN | 110175077 A | 8/2019 |

(Continued)

OTHER PUBLICATIONS

PCT International Search Report and Written Opinion, dated Dec. 2, 2022, regarding Application No. PCT/EP2022/072545, 10 pages.

*Primary Examiner* — Andrew J Steinle
(74) *Attorney, Agent, or Firm* — Yee & Associates, P.C.

(57) ABSTRACT

Securing pods in a container orchestration environment is provided. A container runtime interface command is verified to perform an orchestration action on a set of containers comprising an application workload that corresponds to a service based on matching the container runtime interface command to a rule contained in a trusted execution environment contract included in a pod sandbox virtual machine of a trusted execution environment. It is determined whether the container runtime interface command to perform the orchestration action on the set of containers is valid based finding a matching rule in the trusted execution environment contract. In response to determining that the container runtime interface command to perform the orchestration action on the set of containers is valid, the container runtime interface command is executed to perform the orchestration action on the set of containers in the pod sandbox virtual machine of the trusted execution environment.

22 Claims, 8 Drawing Sheets

(56) References Cited

U.S. PATENT DOCUMENTS

2019/0347678 A1* 11/2019 Eggers .............. G06Q 30/0203
2021/0067512 A1    3/2021 Polepalli Yeshwanth et al.

FOREIGN PATENT DOCUMENTS

| CN | 110519361 A  | 11/2019 |
| CN | 110661657 A  | 1/2020  |
| CN | 110798375 A  | 2/2020  |
| CN | 110941393 A  | 3/2020  |
| CN | 112395048 A  | 2/2021  |
| WO | 2020106973 A1 | 5/2020 |

\* cited by examiner

FIG. 5

- 502: RECEIVE, BY A COMPUTER, AN INPUT TO DEPLOY TO A POD SANDBOX VIRTUAL MACHINE A SET OF CONTAINERS THAT CORRESPONDS TO A SERVICE INTO A TRUSTED EXECUTION ENVIRONMENT OF A CONTAINER ORCHESTRATION ENVIRONMENT FROM A CLIENT DEVICE CORRESPONDING TO AN ADMINISTRATOR OF THE CONTAINER ORCHESTRATION ENVIRONMENT

- 504: RETRIEVE, BY THE COMPUTER, A TRUSTED EXECUTION ENVIRONMENT CONTRACT AND A POD DEPLOYMENT DESCRIPTION FROM A CLIENT DEVICE CORRESPONDING TO AN APPLICATION OWNER PROVIDING THE SERVICE IN THE CONTAINER ORCHESTRATION ENVIRONMENT

- 506: RETRIEVE, BY THE COMPUTER, A POD SANDBOX VIRTUAL MACHINE IMAGE CORRESPONDING TO THE POD SANDBOX VIRTUAL MACHINE FOR THE SERVICE FROM AN EXTERNAL IMAGE REPOSITORY

- 508: GENERATE, BY THE COMPUTER, THE POD SANDBOX VIRTUAL MACHINE FOR THE SERVICE BASED ON THE POD SANDBOX VIRTUAL MACHINE IMAGE

- 510: INSERT, BY THE COMPUTER, THE TRUSTED EXECUTION ENVIRONMENT CONTRACT IN THE POD SANDBOX VIRTUAL MACHINE FOR THE SERVICE

- 512: DIRECT, BY THE COMPUTER, A SECURE AGENT TO PULL A CORRESPONDING CONTAINER IMAGE FOR EACH RESPECTIVE CONTAINER IN A SET OF CONTAINERS THAT CORRESPONDS TO THE SERVICE TO BE INCLUDED IN THE POD SANDBOX VIRTUAL MACHINE FROM THE EXTERNAL IMAGE REPOSITORY

- 514: DIRECT, BY THE COMPUTER, THE SECURE AGENT TO GENERATE EACH RESPECTIVE CONTAINER IN THE SET OF CONTAINERS THAT CORRESPONDS TO THE SERVICE IN THE POD SANDBOX VIRTUAL MACHINE USING THE CORRESPONDING CONTAINER IMAGE PULLED FROM THE EXTERNAL IMAGE REPOSITORY

- 516: DEPLOY, BY THE COMPUTER, THE POD SANDBOX VIRTUAL MACHINE THAT INCLUDES THE TRUSTED EXECUTION ENVIRONMENT CONTRACT AND THE SET OF CONTAINERS THAT CORRESPONDS TO THE SERVICE IN THE TRUSTED EXECUTION ENVIRONMENT BASED ON THE POD DEPLOYMENT DESCRIPTION

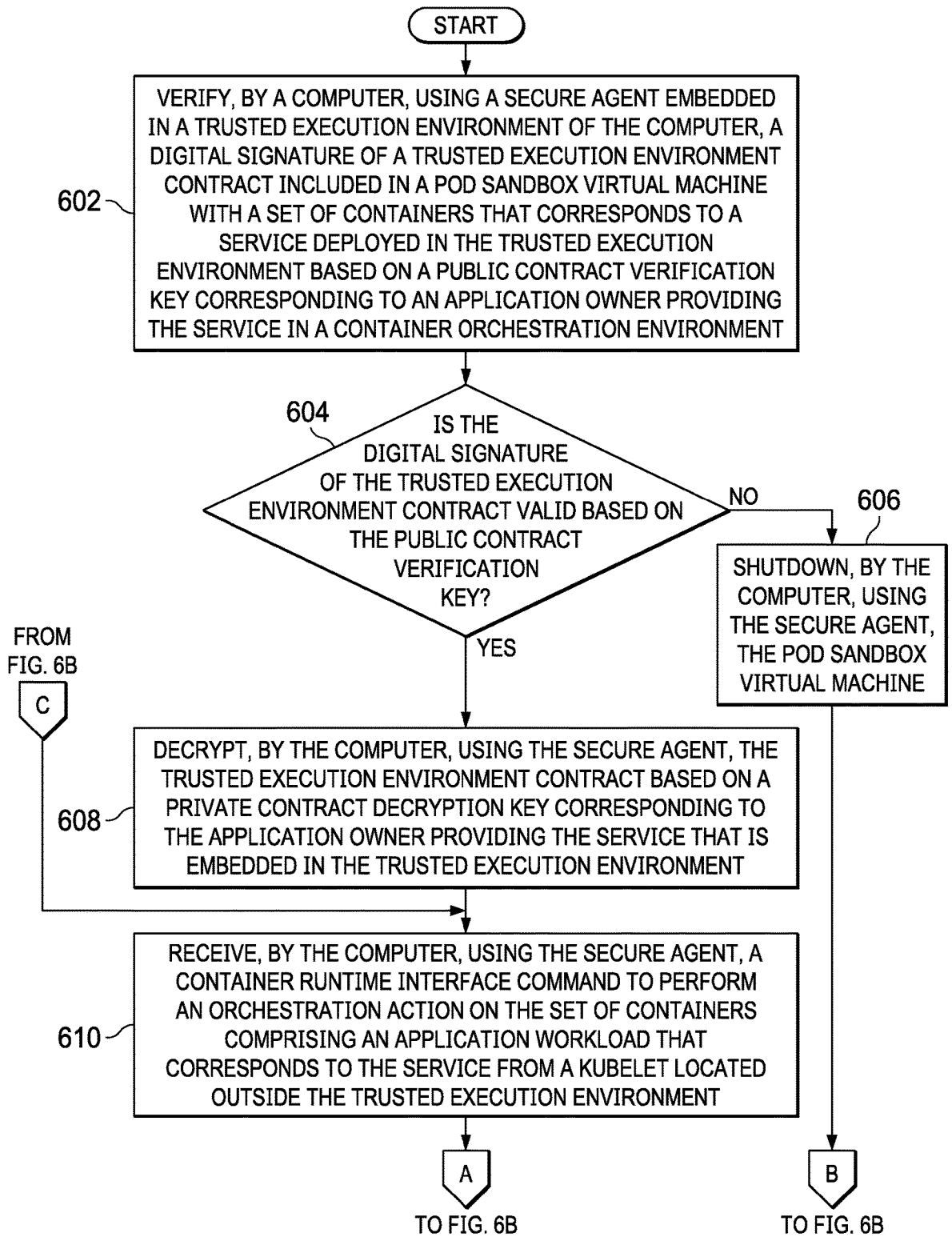

SECURING PODS IN A CONTAINER ORCHESTRATION ENVIRONMENT

BACKGROUND

1. Field

The disclosure relates generally to container orchestration environments and more specifically to increasing pod isolation and security for regulatory compliance in a container orchestration environment while maintaining user experience by only permitting containers that are specified in a pod deployment description and verified against a rule contained in a trusted execution environment contract to run in a trusted execution environment of the container orchestration environment.

2. Description of the Related Art

A container orchestration environment, such as, for example, Kubernetes® (a registered trademark of the Linux Foundation of San Francisco, California), provides a platform for automating deployment, scaling, and operations of application containers across clusters of host nodes. Many cloud services offer a container orchestration environment as a service (e.g., Platform-as-a-Service, Infrastructure-as-a-Service, or the like).

A container orchestration environment includes a controller node, which is a main controlling unit of a cluster of host nodes (also known as compute nodes), managing the cluster's workload, and directing communication across the cluster. The control plane of the cluster, which the control node forms, consists of various components, such as a data store, application programming interface (API) server, scheduler, and controller. The data store contains configuration data of the cluster, representing the overall and desired state of the cluster at any given time. The API server provides internal and external interfaces for the controller node. The API server processes and validates resource availability requests and updates state of API objects in the data store, thereby allowing users (e.g., tenants, clients, customers, or the like) to configure workloads and containers across host nodes in the cluster. The scheduler selects which host node an unscheduled pod runs on, based on resource availability of respective host nodes. A pod is the basic unit managed by the scheduler. The scheduler tracks resource utilization on each host node to ensure that workload is not scheduled in excess of available resources. The controller has a reconciliation loop that drives actual cluster state toward the desired cluster state, communicating with the API server to create, update, and delete the resources the controller manages (e.g., pods, service endpoints, and the like).

A host node is a machine, either physical or virtual, where containers (i.e., application workloads) are deployed. A pod is a group of one or more containers, with shared storage and network resources, and a specification for how to run the containers. A pod's contents are always co-located and co-scheduled, and run in a shared context. The host node hosts the pods that are the components of the application workloads.

In a container orchestration environment, such as Kubernetes, a host node comprises a kubelet, kube-proxy, and container runtime. The kubelet is an agent that runs on each host node and is responsible for the running state of each host node, ensuring that all containers on a host node are running and healthy. The kubelet starts, stops, and maintains containers organized into pods as directed by the control plane. The kube-proxy is responsible for routing network traffic to the appropriate container based on Internet Protocol address of a given container that was included in a request. The container runtime holds the running application, libraries, and their dependencies of a service hosted by the container orchestration environment.

Currently, solutions exist that aim at improving isolation and security of a pod in a container orchestration environment. One current solution, GVisor® (a registered trademark of Google, LLC, Mountain View, California), tries to increase pod isolation and security by using a user space kernel. This solution seeks to shift the threat surface from containers trying to attack the host node to attacking the user space kernel before being able to reach the host node kernel.

Another current solution, Kata Containers® (a registered trademark of OpenStack Foundation, Austin, Texas), seeks to use Kernel-Based Virtual Machine isolation to change the threat surface when a container tries to attack a host node. The Kernel-Based Virtual Machine boundary introduces to a full operating system on top of hardware virtualization, which requires an attack before being able to attack the host node kernel. The Kernel-Based Virtual Machine represents a pod where containers start inside a virtual machine, making it harder for a container to attack the host node.

Both of these current solutions above are concerned with the risk of a container within a pod of a container orchestration environment seeking to attack the host node, but are not concerned with a container orchestration environment administrator launching an attack from the host node into containers of a pod. In addition, these current solutions do not protect memory from the container orchestration environment administrator, nor do they prevent the container orchestration environment administrator from accessing or manipulating the containers within a pod once running.

Yet another current solution, Cloud Data Shield, requires a container to be converted into a form that can be used within a software guard extensions environment. This solution attempts to convert the container automatically for applications written using common programming languages, such as, for example, C++ or the like. Thus, containers for this current solution should be built specifically for the software guard extensions environment. This current solution can protect the pod/application from a container orchestration environment administrator, but does so by forcing a change to the containers being run, which changes or alters the user experience in the container orchestration environment.

SUMMARY

According to one illustrative embodiment, a computer-implemented method for securing pods in a container orchestration environment is provided. A computer, using an agent embedded in a trusted execution environment of the computer, verifies a container runtime interface command to perform an orchestration action on a set of containers comprising an application workload that corresponds to a service hosted by the container orchestration environment based on matching the container runtime interface command to a rule contained in a trusted execution environment contract included in a pod sandbox virtual machine of the trusted execution environment. The computer, using the agent, determines whether the container runtime interface command to perform the orchestration action on the set of containers is valid based finding a matching rule in the trusted execution environment contract. In response to the computer determining, using the agent, that the container runtime interface command to perform the orchestration action on the set of containers is valid based on finding the matching rule in the trusted execution environment contract, the computer, using the agent, executes the container runtime interface command to perform the orchestration action on the set of containers comprising the application workload that corresponds to the service in the pod sandbox virtual machine of the trusted execution environment. According to other illustrative embodiments, a computer system and computer program product for securing pods in a container orchestration environment are provided.

According to another illustrative embodiment, a method for securing pods is provided. A container runtime interface command is verified to perform an orchestration action on a set of containers comprising an application workload that corresponds to a service based on matching the container runtime interface command to a rule contained in a trusted execution environment contract included in a pod sandbox virtual machine of a trusted execution environment. It is determining whether the container runtime interface command to perform the orchestration action on the set of containers is valid based finding a matching rule in the trusted execution environment contract. In response to determining that the container runtime interface command to perform the orchestration action on the set of containers is valid based on finding the matching rule in the trusted execution environment contract, the container runtime interface command is executed to perform the orchestration action on the set of containers comprising the application workload that corresponds to the service in the pod sandbox virtual machine of the trusted execution environment.

As a result, the illustrative embodiments increase pod isolation and security in the container orchestration environment while maintaining user experience.

The illustrative embodiments also optionally verify, using the agent, a digital signature of the trusted execution environment contract included in the pod sandbox virtual machine with the set of containers that corresponds to the service deployed in the trusted execution environment based on a contract verification key corresponding to an application owner providing the service in the container orchestration environment. Further, the illustrative embodiments optionally verify authenticity of a corresponding container image for each respective container in the set of containers to prevent an attempt to pull a different container image in at runtime using a corresponding public key contained in the trusted execution environment contract to validate a signature associated with an image from an image repository.

As a result, the illustrative embodiments optionally only permit containers that are specified in a pod deployment description and verified against a rule contained in a trusted execution environment contract to run in a trusted execution environment of the container orchestration environment. Furthermore, the illustrative embodiments optionally allow technical separation and protection of the preparation of the trusted execution environment contract and pod deployment description from the orchestration of the cluster.

BRIEF DESCRIPTION OF THE DRAWINGS

FIG. 5 is a flowchart illustrating a process for deploying a pod sandbox virtual machine in a trusted execution environment in accordance with an illustrative embodiment; and FIGS. 6A-6B are a flowchart illustrating a process for verifying commands to run application workloads using containers located within a trusted execution environment in accordance with an illustrative embodiment.

DETAILED DESCRIPTION

Figure 1:
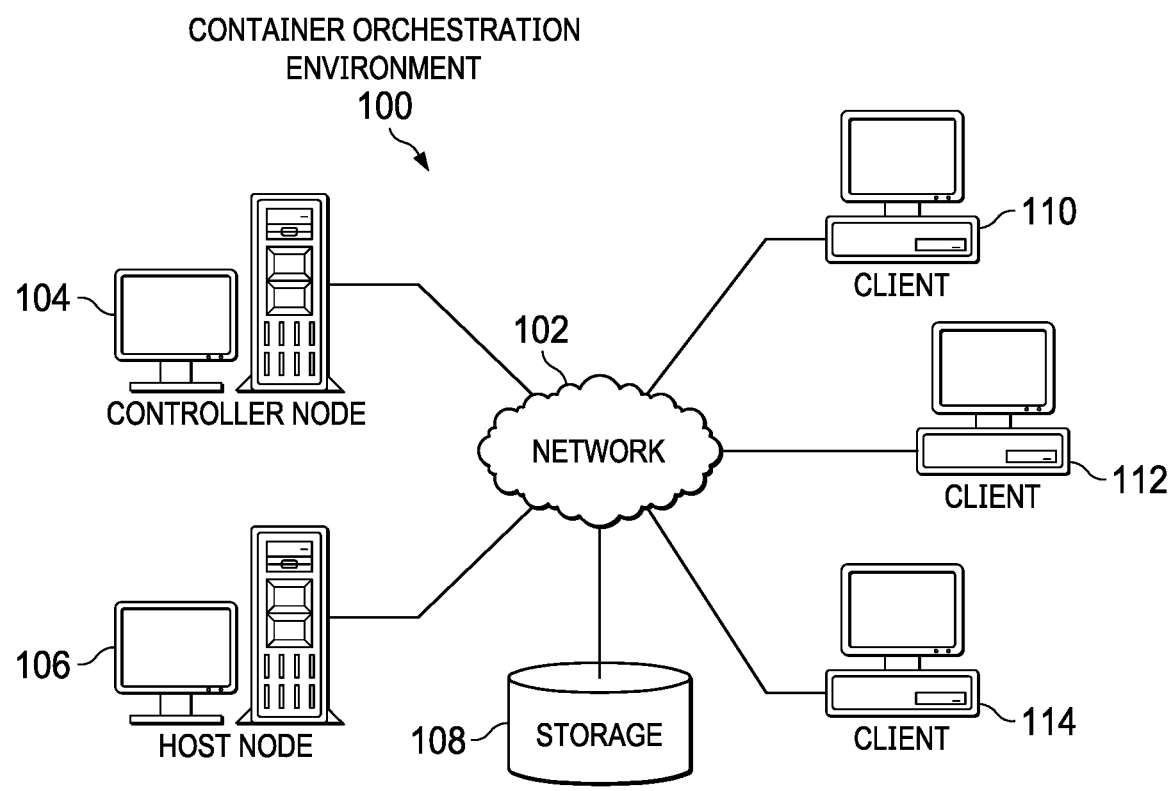
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a container orchestration environment in which illustrative embodiments may be implemented. Container orchestration environment 100 is a network of computers, data processing systems, and other devices in which the illustrative embodiments may be implemented. Container orchestration environment 100 provides automatic deployment, scaling, and operations of pods. Each pod comprises a set of containers for running application workloads, which correspond to a set of services hosted by container orchestration environment 100. Container orchestration environment 100 may be, for example, a Kubernetes environment. However, Kubernetes is intended as an example only and not as a limitation on illustrative embodiments. In other words, illustrative embodiments may be implemented in any type of container orchestration environment, platform, or infrastructure.

Container orchestration environment 100 contains network 102, which is the medium used to provide communications links between the computers, data processing systems, and other devices connected together within container orchestration environment 100. Network 102 may include connections, such as, for example, wire communication links, wireless communication links, fiber optic cables, and the like.

In the depicted example, container orchestration environment 100 includes controller node 104 and host node 106, along with storage 108. Controller node 104 and host node 106 may be, for example, server computers with high-speed connections to network 102. In addition, controller node 104 and host node 106 may each represent a cluster of servers in one or more data centers. Alternatively, controller node 104 and host node 106 may each represent multiple computing nodes in one or more cloud environments. Further, controller node 104 and host node 106 may each include a set of virtual machines.

Controller node 104 receives and tracks orchestration requests to perform application workloads from users, such as, for example, customers, clients, tenants, or the like. In addition, controller node 104 controls a cluster of host nodes, which is represented by host node 106, that performs the application workloads corresponding to services requested by the users.

Client 110, client 112, and client 114 also connect to network 102. Clients 110, 112, and 114 are clients of controller node 104 and host node 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102.

Users of clients 110, 112, and 114 may utilize clients 110, 112, and 114 to submit orchestration request to perform application workloads corresponding to the set of services hosted by container orchestration environment 100. An application workload may be any type of workload, such as, for example, data processing, image processing, transaction processing, sensor monitoring, scientific calculations, forecasts, predictions, or the like. It should be noted that client device users may also include, for example, administrators of container orchestration environment 100, application owners that provide the containerized applications for the set of services hosted by container orchestration environment 100 and pod deployment descriptions, container developers that create container images corresponding to the containers that run the application workloads of the set of services, and the like.

Storage 108 is a network storage device capable of storing any type of data in a structured format or an unstructured format. In addition, storage 108 may represent a plurality of network storage devices. Further, storage 108 may store a plurality of different images, such as, for example, container images, virtual machine images, pod sandbox virtual machine images, kernel-based virtual machine images, and the like. Furthermore, storage 108 may store other types of data, such as authentication or credential data that may include usernames, passwords, and the like, associated with, for example, container orchestration environment administrators.

In addition, it should be noted that container orchestration environment 100 may include any number of additional computer nodes, client devices, storage devices, and other devices not shown. Program code located in container orchestration environment 100 may be stored on a computer-readable storage medium or a set of computer-readable storage media and downloaded to a computer or other data processing device for use. For example, program code may be stored on a computer-readable storage medium on controller node 104 and downloaded to host node 106 over network 102 for use on host node 106.

In the depicted example, container orchestration environment 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
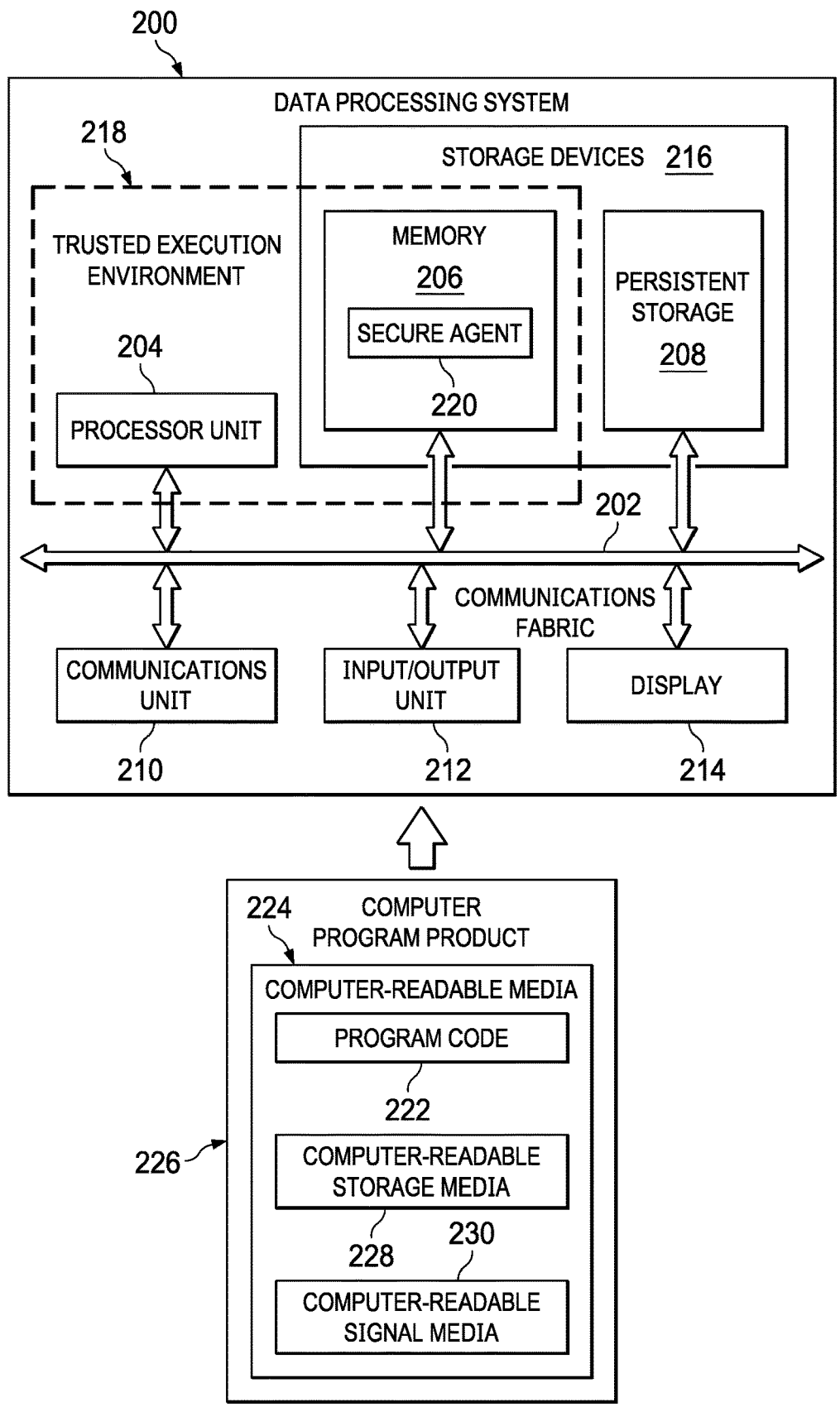
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as host node 106 in FIG. 1, in which computer-readable program code or instructions implementing pod isolation and security processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation. In addition, processor unit 204 may be, for example, a central processing unit, graphics processing unit, specialized processor, or the like.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, processor unit 204 and memory 206 comprise trusted execution environment 218. However, it should be noted that even though this example illustrates all of processor unit 204 and memory 206 comprising trusted execution environment 218, in an alternative illustrative embodiment only a localized secure area of processor unit 204 and memory 206 may be used to comprise trusted execution environment 218. In another alternative illustrative embodiment, processor unit 204, which includes a memory component, can comprise trusted execution environment 218. Trusted execution environment 218 provides isolated and secure execution of a set of containers in a pod sandbox virtual machine corresponding to a service, which is provided by an application owner in a container orchestration environment, based on a set of rules contained in a trusted execution environment contract that corresponds to a pod deployment description for the set of containers. Furthermore, trusted execution environment 218 may represent a set of trusted execution environments located in data processing system 200.

In this example, memory 206 stores secure agent 220. In an alternative illustrative embodiment, secure agent 220 may be located on processor unit 204. In another alternative illustrative embodiment, a portion of secure agent 220 may be located on memory 206 and another portion of secure agent 220 may be located on processor unit 204. Secure agent 220 stores the trusted execution environment contract within trusted execution environment 218 and controls the process of only permitting containers that are specified in the pod deployment description and verified against a rule contained in the trusted execution environment contract to run in trusted execution environment 218. Further, secure agent 220 allows technical separation and protection of the preparation of the trusted execution environment contract and pod deployment description from orchestration of a cluster.

As a result, data processing system 200 operates as a special purpose computer system in which secure agent 220 within trusted execution environment 218 of data processing system 200 enables increased pod isolation and security for regulatory conformance while maintaining user experience in the container orchestration environment. In particular, secure agent 220 in trusted execution environment 218 transforms data processing system 200 into a special purpose computer system as compared to currently available general computer systems that do not have secure agent 220.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 222 is located in a functional form on computer-readable media 224 that is selectively removable and may be loaded onto or transferred to data processing system 200 for running by processor unit 204. Program code 222 and computer-readable media 224 form computer program product 226. In one example, computer-readable media 224 may be computer-readable storage media 228 or computer-readable signal media 230.

In these illustrative examples, computer-readable storage media 228 is a physical or tangible storage device used to store program code 222 rather than a medium that propagates or transmits program code 222. Computer-readable storage media 228 may include, for example, an optical or magnetic disc that is inserted or placed into a drive or other device that is part of persistent storage 208 for transfer onto a storage device, such as a hard drive, that is part of persistent storage 208. Computer-readable storage media 228 also may take the form of a persistent storage, such as a hard drive, a thumb drive, or a flash memory that is connected to data processing system 200.

Alternatively, program code 222 may be transferred to data processing system 200 using computer-readable signal media 230. Computer-readable signal media 230 may be, for example, a propagated data signal containing program code 222. For example, computer-readable signal media 230 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 224" can be singular or plural. For example, program code 222 can be located in computer-readable media 224 in the form of a single storage device or system. In another example, program code 222 can be located in computer-readable media 224 that is distributed in multiple data processing systems. In other words, some instructions in program code 222 can be located in one data processing system while other instructions in program code 222 can be located in one or more other data processing systems. For example, a portion of program code 222 can be located in computer-readable media 224 in a server computer while another portion of program code 222 can be located in computer-readable media 224 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 222.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Current trends toward serverless computing are leading to increased multiuser expectations within a managed cluster of host nodes in a container orchestration environment, which increases the security expectations within the managed cluster of host nodes. These current trends lead to a need to reexamine privileges of a container orchestration environment administrator and how to protect a user's data and applications from the container orchestration environment administrator.

Increasing isolation between, and security of, pods in a container orchestration environment from a container orchestration environment administrator needs to be achieved without compromising or decreasing user experience. For example, using a trusted execution environment in a container orchestration environment should lead to increased pod security. However, if a container orchestration environment administrator is not trusted, then in addition to protecting memory and increasing pod isolation via a trusted execution environment in a container orchestration environment, a need exists to ensure that the container orchestration environment administrator cannot manipulate what is running in the trusted execution environment to gain access to a user's data or subvert the user's applications.

Illustrative embodiments take into account and address the issues of protecting a user's data and applications from a container orchestration environment administrator at runtime using a trusted execution environment to protect memory, while preserving the container orchestration environment user experience and pod security expectations for regulatory conformance. In addition, illustrative embodiments do not need to rebuild or convert containers, which changes the user experience, as some current solutions do. For example, illustrative embodiments can supplement any existing pod deployment description to utilize the trusted execution environment in the container orchestration environment. Further, after illustrative embodiments initialize the trusted execution environment, illustrative embodiments will only permit containers and behavior specified in the pod deployment description to execute at container deployment time.

The role of creating a pod deployment description can belong to a different persona other than the container orchestration environment administrator who manages the container orchestration environment. For example, an application owner can create a pod deployment description and give the pod deployment description to a container orchestration environment administrator to use and manage a cluster of host nodes for running containerized applications within the container orchestration environment. The application owner provides a service by running an application on the container orchestration environment. Illustrative embodiments deploy the application in a set of containers as defined in the pod deployment description. Protection should exist to ensure that the container orchestration environment administrator cannot change the pod deployment description before container deployment in such a way as to compromise an application owner's intention and expectations regarding application and data security.

Illustrative embodiments ensure that the pod deployment description, as defined by the application owner, is what controls what occurs inside the trusted execution environment runtime once illustrative embodiments start the trusted execution environment runtime. In other words, illustrative embodiments do not permit any additional actions to occur inside the trusted execution environment runtime by a container orchestration environment administrator or any other administrator with access to the container orchestration environment if that action is not defined in the pod deployment description. It should be noted that illustrative embodiments utilize a trusted execution environment that provides protection of memory from the container orchestration environment administrator or anything else outside the trusted execution environment. Also, it should be noted that illustrative embodiments preserve the user experience of the container orchestration environment and the role of a pod sandbox virtual machine (e.g., a kernel-based virtual machine) in deploying containers. A kernel-based virtual machine is a virtualization component in the operating system kernel that allows the operating system kernel to function as, for example, a hypervisor, virtual machine manager, or the like, which allows a host machine to run multiple, isolated virtual environments called guests or virtual machines.

Illustrative embodiments utilize the trusted execution environment to represent a pod of containers in the container orchestration environment. Furthermore, illustrative embodiments launch a secure agent inside the trusted execution environment to process pod sandbox virtual machine semantics, which are driven by the container orchestration environment via a container runtime interface application programming interface and a container runtime (e.g., Open Container Initiative). The Open Container Initiative contains two specifications: 1) a runtime specification; and 2) an image specification.

The secure agent includes a registration process that controls which containers the secure agent will permit to run within the trusted execution environment (e.g., the pod sandbox virtual machine). Illustrative embodiments first generate a pod sandbox virtual machine in the container orchestration environment before launching a set of containers within the pod sandbox virtual machine so that generation of the pod sandbox virtual machine results in the trusted execution environment starting with the secure agent running inside.

Illustrative embodiments extend a human-readable data-serialization language (e.g., YAML Ain't Markup Language (YAML)) of the container orchestration environment to include a trusted execution environment contract. Illustrative embodiments place the trusted execution environment contract in the secure agent when illustrative embodiments generate the pod sandbox virtual machine before any container deployment occurs. However, it should be noted that multiple ways exist to pass the trusted execution environment contract from the application owner to the secure agent in the trusted execution environment. For example, the application owner can include the trusted execution environment contract in the pod deployment description or can send the trusted execution environment contract as a separate document to the controller node.

The secure agent enforces the trusted execution environment contract within the trusted execution environment by validating or verifying any external orchestration request from the container runtime, container orchestration environment administrator, or any other source outside the trusted execution environment against rules included in the trusted execution environment contract. It should be noted that the orchestration request can include a sequence of commands to deploy or start an application workload. The secure agent refuses any orchestration request to be performed that is not permitted by a rule in the trusted execution environment contract. The secure agent also verifies that an encrypted image can be decrypted correctly using a decryption key from one of the trusted execution environment contract or another source. The trusted execution environment contract can include, for example, signature information corresponding to the set of containers to be run within the pod sandbox virtual machine preventing any attempt to pull different container images in at runtime. If the trusted execution environment supports asymmetric encryption with a private key only available inside the trusted execution environment, then all or certain portions of the trusted execution environment contract can be encrypted preventing the container orchestration environment administrator from seeing specific details or secrets contained within the trusted execution environment contract.

Illustrative embodiments incorporate the trusted execution environment contract within the pod deployment description. Illustrative embodiments can encrypt the pod deployment description using an asymmetric public cryptographic key, which means that the pod deployment description can only be decrypted using a corresponding private cryptographic key located inside the trusted execution environment.

The secure agent within the trusted execution environment is capable of decrypting the trusted execution environment contract using the private key and enforcing the trusted execution environment contract within a boundary of the trusted execution environment. It should be noted that the trusted execution environment comprises a secure portion of a main memory and a secure portion of a processor (e.g., a central processing unit, graphics processing unit, specialized processor, or the like) coupled to the host node. The secure portion may include all or only a specific area within the main memory and the processor.

When illustrative embodiments establish the trusted execution environment in the container orchestration environment, illustrative embodiments also establish the secure agent within the boundary of the trusted execution environment and pass the trusted execution environment contract to the secure agent. This means that after illustrative embodiments establish the trusted execution environment in the container orchestration environment there need no longer be trust across the boundary of the trusted execution environment boundary because illustrative embodiments route actions to change the set of containers running on devices (e.g., processor, memory, and the like) included within the trusted execution environment boundary to the secure agent, which validates the actions against rules of the trusted execution environment contract. It should be noted that illustrative embodiments utilize a trusted boot mechanism to bring up the trusted execution environment until the secure agent becomes active, where the trusted boot mechanism validates every binary image (e.g., firmware, operating system image, or the like) by verifying signature of each respective binary image. Once the secure agent becomes active, illustrative embodiments no longer need the trusted boot mechanism since the secure agent validates any requests to change or modify the trusted execution environment (e.g., deploy a container)).

The trusted execution environment contract can include, for example, at least one of signatures corresponding to containers, restrictions on containers, secrets, cryptographic keys, or the like. The signatures correspond to the set of containers that are permitted to run in the trusted execution environment (e.g., pod sandbox virtual machine). The signature may be, for example, a digital signature corresponding to an application owner. In a typical use case, a trusted execution environment contract can include a (public) signature verification key from a container developer who signs the container image. When the secure agent pulls a container image from an external repository, the secure agent can verify the signature corresponding to the container image using the corresponding private key contained in the trusted execution environment contract to validate or verify that the container image is authentic (e.g., not modified in any way) to prevent an attempt to pull a different container image in at runtime. Furthermore, the application owner signs the entire trusted execution environment contract, and the trusted execution environment contract includes that signature. The secure agent verifies the contract signature using the owner's contract signature verification key to confirm that the contract is authentic (e.g., not modified in any way). Illustrative embodiments can embed the contract signature verification key in a peer pod virtual machine image or can pass the contract signature verification key to the trusted execution environment via another path. The restrictions on the containers define which containers in the set of containers can gain access to at least one of configuration maps, secrets, or persistent volume claims, which describe how a container consumes a persistent volume. The secrets or cryptographic keys are used inside the trusted execution environment to decrypt at least one of secrets, configuration maps, or persistent volumes that are attached or provided to the trusted execution environment.

Thus, illustrative embodiments using the secure agent can provide data to a specific set of containers in a secure manner so that the data are only visible unencrypted within the trusted execution environment to that specific set of containers. To achieve this, illustrative embodiments extend the container orchestration environment deployment description for a pod to include an encrypted trusted execution environment contract. Illustrative embodiments can provide the trusted execution environment contract using several existing points within a pod deployment description, such as, for example, as a well-named configuration map that the secure agent understands, by extending the pod security context section with the pod deployment description YAML, or the like. Also, by extending the implementation of the container runtime interface, anything that gets passed via a container runtime interface call to RunPodSandbox (e.g., RunPodSandboxRequest) is available to illustrative embodiments at the time illustrative embodiments establish the secure agent within the trusted execution environment. However, it should be noted that illustrative embodiments can use information passed on initial container runtime interface calls by extending the container runtime implementation to ensure that this information is available to the secure agent within the trusted execution environment.

Thus, illustrative embodiments provide one or more technical solutions that overcome a technical problem with isolating and securing pods for regulatory conformance in a container orchestration environment while maintaining user experience. As a result, these one or more technical solutions provide a technical effect and practical application in the field of container orchestration environments.

Figure 3:
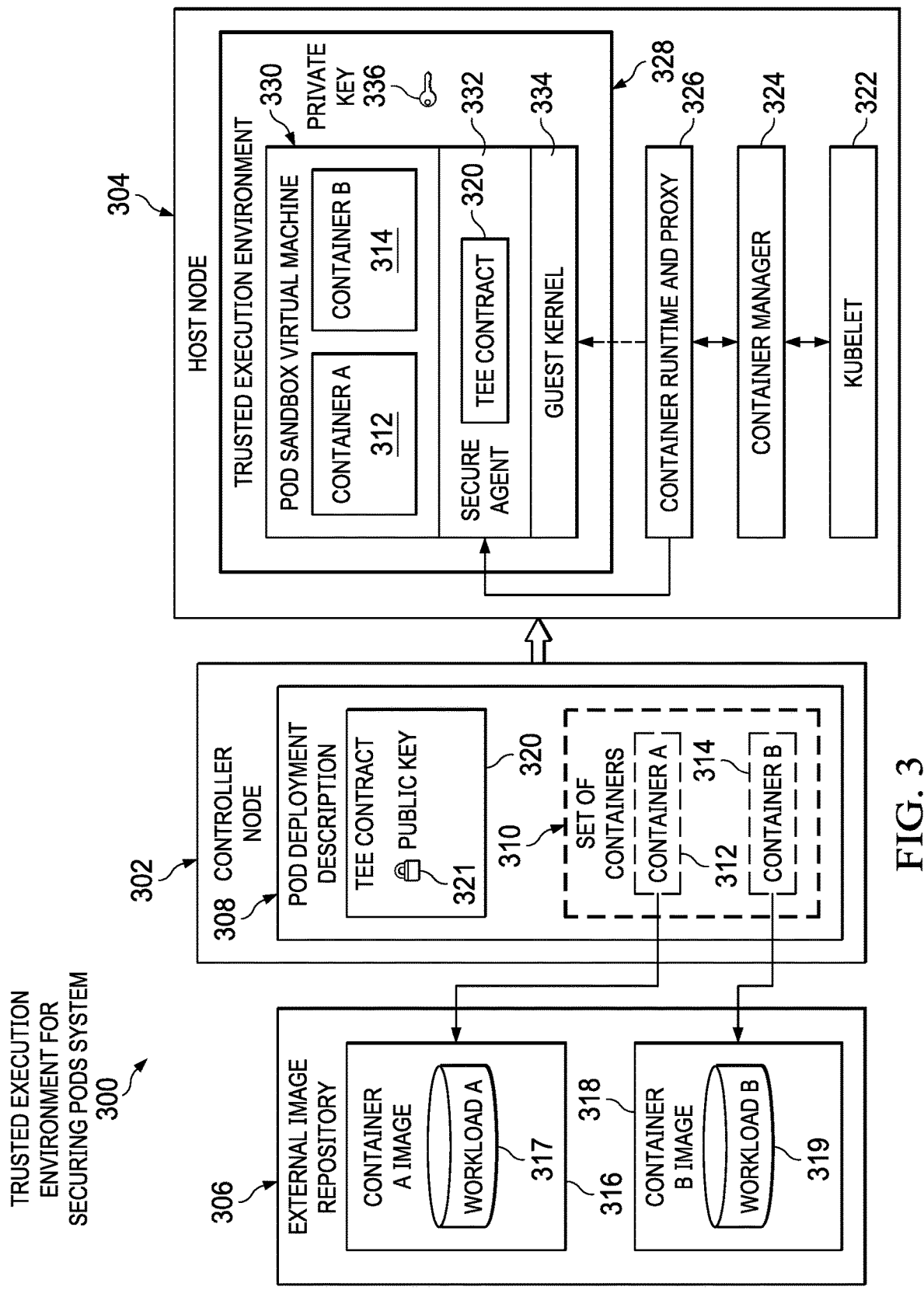
FIG. 3 is a diagram illustrating a trusted execution environment for securing pods system in accordance with an illustrative embodiment.

With reference now to FIG. 3 is a diagram illustrating a trusted execution environment for securing pods system is depicted in accordance with an illustrative embodiment. Trusted execution environment for securing pods system 300 may be implemented in a container orchestration environment, such as container orchestration environment 100 in FIG. 1. Trusted execution environment for securing pods system 300 is a system of hardware and software components for increasing pod isolation and security for regulatory compliance in the container orchestration environment while maintaining user experience by only permitting containers that are specified in a pod deployment description and verified against a rule contained in a trusted execution environment contract to run in a trusted execution environment of the container orchestration environment. Furthermore, trusted execution environment for securing pods system 300 allows technical separation and protection of the preparation of the trusted execution environment contract and pod deployment description from orchestration of a cluster.

In this example, trusted execution environment for securing pods system 300 includes controller node 302, host node 304, and external image repository 306. Controller node 302 may be, for example, controller node 104 in FIG. 1. Host node 304 may be, for example, host node 106 in FIG. 1 or data processing system 200 in FIG. 2. External image repository 306 may be, for example, storage 108 in FIG. 1. However, it should be noted that trusted execution environment for securing pods system 300 is intended as an example only and not as a limitation on illustrative embodiments. In other words, trusted execution environment for securing pods system 300 may include any number of controller nodes, host nodes, external image repositories, and other components not shown.

Controller node 302 includes pod deployment description 308. An application owner that provides a service on the container orchestration environment creates pod deployment description 308 and sends pod deployment description 308 to controller node 302. Pod deployment description 308 specifies that set of containers 310, which corresponds to the service provided by the application owner on the container orchestration environment, are to be deployed on host node 304 to run application workloads of the service. In this example, set of containers 310 includes container A 312 and container B 314. However, it should be noted that set of containers 310 is intended as an example only and not as a limitation on illustrative embodiments. In other words, set of containers 310 may include more or fewer containers than illustrated.

In this example, external image repository 306 stores container A image 316 and container B image 318. However, external image repository 306 may store any number of container images. Container A 312 corresponds to container A image 316 for running application workload A 317 corresponding to the service provided by the application owner. Similarly, container B 314 corresponds to container B image 318 for running application workload B 319 corresponding to the service provided by the application owner.

Pod deployment description 308 further includes trusted execution environment contract 320. The application owner also creates trusted execution environment contract 320. In this example, trusted execution environment contract 320 is encrypted using public key 321, which corresponds to the application owner. Also, in this example the application owner inserted trusted execution environment contract 320 into pod deployment description 308 prior to sending pod deployment description 308 to controller node 302. Alternatively, the application owner can send pod deployment description 308 and trusted execution environment contract 320 separately to controller node 302.

Trusted execution environment contract 320 may include, for example, signature information corresponding to container A 312 and container B 314 of set of containers 310 to be run within pod sandbox virtual machine 330 preventing any other container images from being pulled in at runtime. Trusted execution environment contract 320 may also include restrictions on container A 312 and container B 314, secrets, cryptographic keys, and the like.

Controller node 302 sends pod deployment description 308, which in this example includes trusted execution environment contract 320, to host node 304. Host node 304 includes kubelet 322, container manager 324, container runtime and proxy 326, and trusted execution environment 328. Trusted execution environment 328 may be, for example, trusted execution environment 218 in FIG. 2. Also, it should be noted that host node 304 may include a set of trusted execution environments. Kubelet 322 starts and stops containers on host node 304 as directed by the control plane of controller node 302. Container manager 324 ensures that all containers on host node 304 are running and healthy. Container runtime and proxy 326 holds the running application, libraries, and their dependencies of the service provided by the application owner and is responsible for routing network traffic to the appropriate container.

Trusted execution environment 328 includes pod sandbox virtual machine 330, secure agent 332, and guest kernel 334. Guest kernel 334 represents a guest operating system for pod sandbox virtual machine 330. Secure agent 332 may be, for example, secure agent 220 in FIG. 2. When illustrative embodiments generate secure agent 332 in trusted execution environment 328, illustrative embodiments extract trusted execution environment contract 320 from pod deployment description 308 and embed trusted execution environment contract 320 in secure agent 332 after verifying a signature of trusted execution environment contract 320. In addition, illustrative embodiments decrypt trusted execution environment contract 320 using private key 336, which is only available in trusted execution environment 328. Private key 336 corresponds to public key 321. Further, secure agent 332 verifies that container A 312 and container B 314 are allowed to run in pod sandbox virtual machine 330 according to pod deployment description 308 based on signature information and rules contained in trusted execution environment contract 320.

Figure 4A:
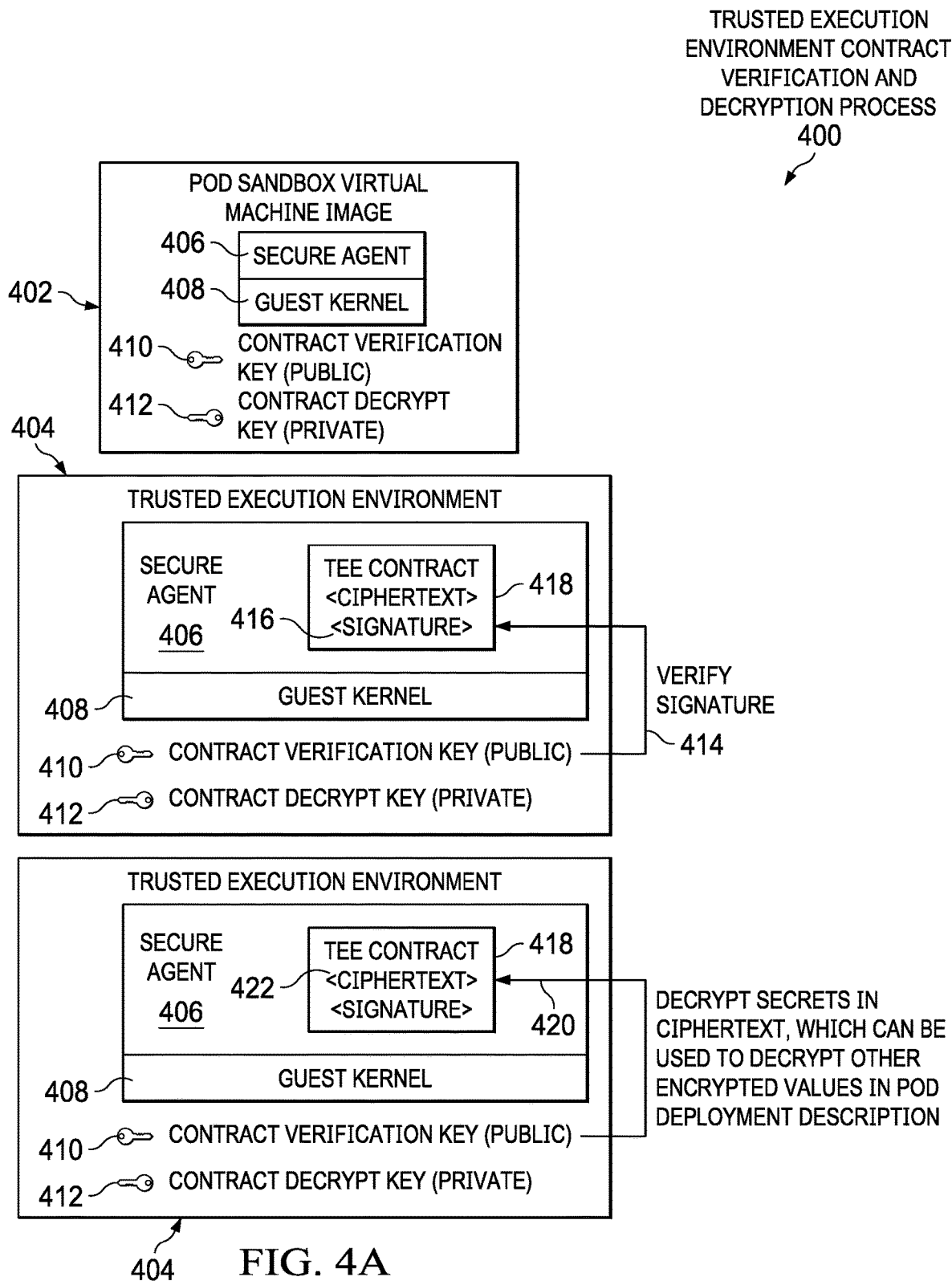
FIGS. 4A-4B are a diagram illustrating an example of a trusted execution environment contract verification and decryption process in accordance with an illustrative embodiment.
Figure 4B:
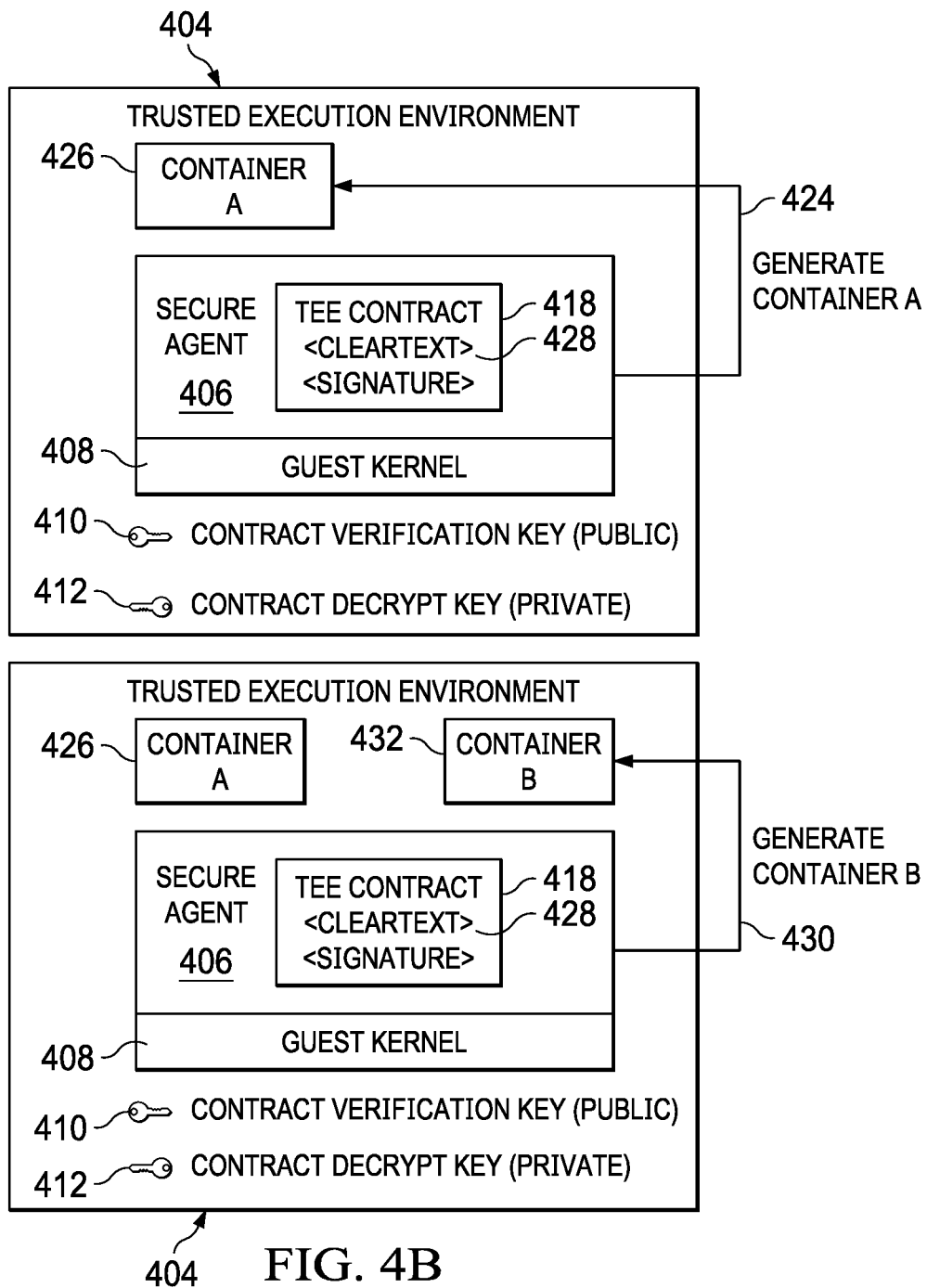

With reference now to FIGS. 4A-4B, a diagram illustrating an example of a trusted execution environment contract verification and decryption process is depicted in accordance with an illustrative embodiment. Trusted execution environment contract verification and decryption process 400 may be implemented in a computer, such as, for example, host node 106 in FIG. 1, data processing system 200 in FIG. 2, or host node 304 in FIG. 3.

Trusted execution environment contract verification and decryption process 400 includes pod sandbox virtual machine image 402 and trusted execution environment 404. Pod sandbox virtual machine image 402 corresponds to a pod sandbox virtual machine, such as, for example, pod sandbox virtual machine 330 in FIG. 3. Trusted execution environment 404 may be, for example, trusted execution environment 328 in FIG. 3.

In this example, pod sandbox virtual machine image 402 includes secure agent 406 and guest kernel 408, such as, for example, secure agent 332 and guest kernel 334 in FIG. 3. Pod sandbox virtual machine image 402 also includes contract verification key 410 and contract decryption key 412, such as, for example, public key 321 and private key 336, respectively, in FIG. 3.

At 414, secure agent 406 verifies signature 416 of trusted execution environment contract 418 using contract verification key 410. Trusted execution environment contract 418 may be, for example, trusted execution environment contract 320 in FIG. 3. At 420, secure agent 406 decrypts ciphertext 422, such as, for example, signature information, rules, secrets, cryptographic keys, and the like, contained in trusted execution environment contract 418 using contract decryption key 412. Secure agent 406 may use the secrets or cryptographic keys contained in trusted execution environment contract 418 to decrypt encrypted information or values in a pod deployment description, such as, for example, pod deployment description 308 in FIG. 3.

At 424, secure agent 406 generates container A 426, such as, for example, container A 312 in FIG. 3, in the pod sandbox virtual machine of trusted execution environment 404 after verifying a signature of container A 426 based on signature information contained in clear text 428. Clear text 428 corresponds to ciphertext 422 after decryption. Similarly, at 430, secure agent 406 generates container B 432, such as, for example, container B 314 in FIG. 3, in the pod sandbox virtual machine of trusted execution environment 404 after verifying a signature of container B 432 based on signature information contained in clear text 428.

With reference now to FIG. 5, a flowchart illustrating a process for deploying a pod sandbox virtual machine in a trusted execution environment is shown in accordance with an illustrative embodiment. The process shown in FIG. 5 may be implemented in a computer, such as, for example, host node 106 in FIG. 1, data processing system 200 in FIG. 2, or host node 304 in FIG. 3. For example, the process shown in FIG. 5 may be implemented in secure agent 220 in FIG. 2 or secure agent 332 in FIG. 3.

The process begins when the computer receives an input to deploy to a pod sandbox virtual machine a set of containers that corresponds to a service into a trusted execution environment of a container orchestration environment from a client device corresponding to an administrator of the container orchestration environment (step 502). In response to receiving the input to deploy to the pod sandbox virtual machine the set of containers into the trusted execution environment, the computer retrieves a trusted execution environment contract and a pod deployment description from a client device corresponding to an application owner providing the service in the container orchestration environment (step 504). In addition, the computer retrieves a pod sandbox virtual machine image corresponding to the pod sandbox virtual machine for the service from an external image repository (step 506).

The computer generates the pod sandbox virtual machine for the service based on the pod sandbox virtual machine image (step 508). Further, the computer inserts the trusted execution environment contract in the pod sandbox virtual machine for the service (step 510). Furthermore, the computer directs a secure agent of the computer to pull a corresponding container image for each respective container in a set of containers that corresponds to the service to be included in the pod sandbox virtual machine from the external image repository (step 512). Moreover, the computer directs the secure agent to generate each respective container in the set of containers that corresponds to the service in the pod sandbox virtual machine using the corresponding container image pulled from the external image repository (step 514). Afterward, the computer, using the secure agent, deploys the pod sandbox virtual machine, which includes the trusted execution environment contract and the set of containers that corresponds to the service, in the trusted execution environment based on the pod deployment description (step 516). It should be noted that a portion of the pod deployment description and a portion of the trusted execution environment contract can be encrypted using a public key corresponding to the application owner. The secure agent can decrypt encrypted portions of the pod deployment description and the trusted execution environment contract using a corresponding private key located inside the trusted execution environment.

Figure 6B:
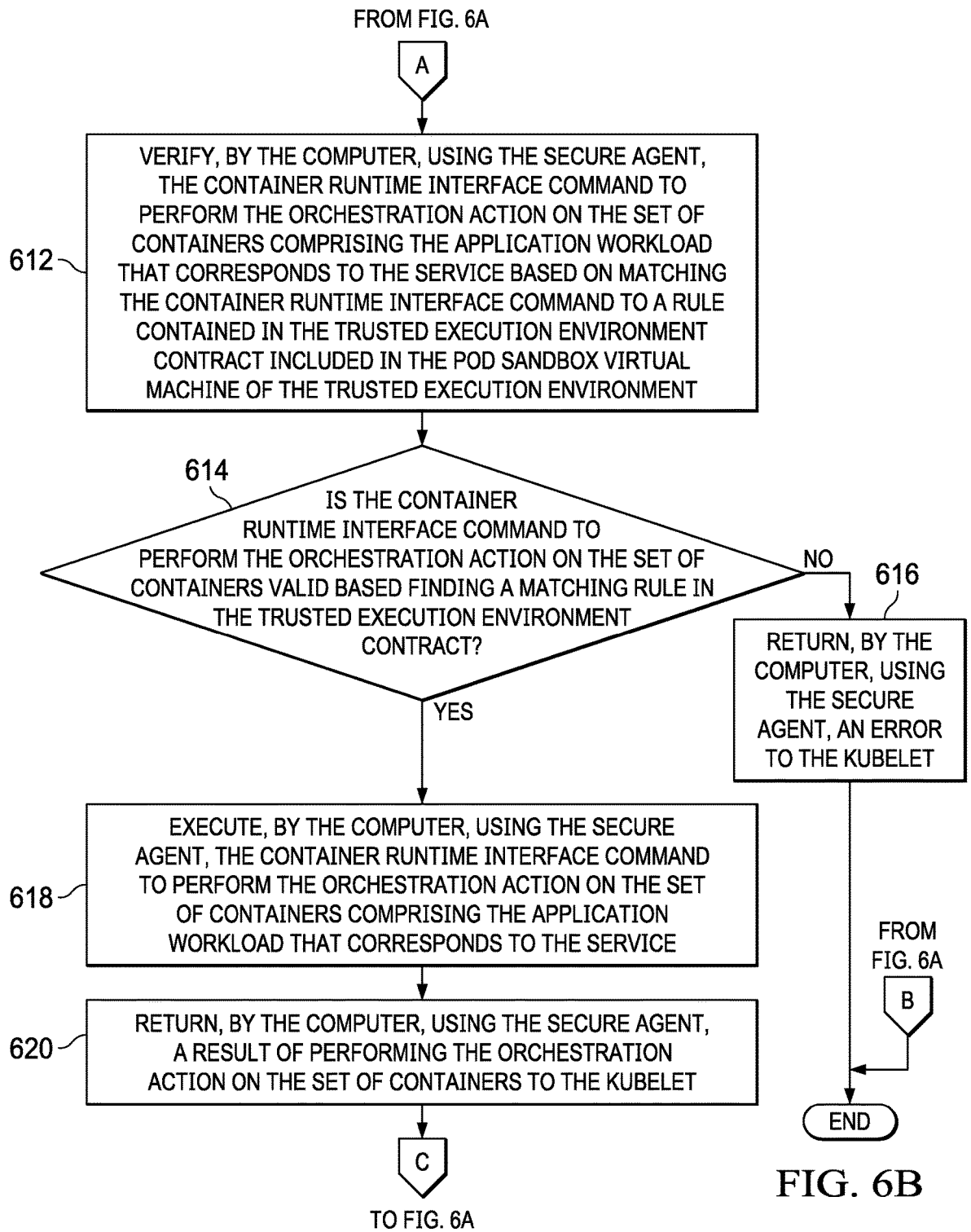

With reference now to FIGS. 6A-6B, a flowchart illustrating a process for verifying commands to run application workloads using containers located within a trusted execution environment is shown in accordance with an illustrative embodiment. The process shown in FIGS. 6A-6B may be implemented in a computer, such as, for example, host node 106 in FIG. 1, data processing system 200 in FIG. 2, or host node 304 in FIG. 3. For example, the process shown in FIGS. 6A-6B may be implemented in secure agent 220 in FIG. 2 or secure agent 332 in FIG. 3.

The process begins when the computer, using a secure agent embedded in a trusted execution environment of the computer, verifies a digital signature of a trusted execution environment contract included in a pod sandbox virtual machine with a set of containers that corresponds to a service deployed in the trusted execution environment based on a public contract verification key corresponding to an application owner providing the service in a container orchestration environment (step 602). The computer, using the secure agent, makes a determination as to whether the digital signature of the trusted execution environment contract is valid based on the public contract verification key (step 604).

If the computer, using the secure agent, determines that the digital signature of the trusted execution environment contract is invalid based on the public contract verification key, no output of step 604, then the computer, using the secure agent, shuts down the pod sandbox virtual machine (step 606). Thereafter, the process terminates. If the computer, using the secure agent, determines that the digital signature of the trusted execution environment contract is valid based on the public contract verification key, yes output of step 604, then the computer, using the secure agent, decrypts the trusted execution environment contract based on a private contract decryption key corresponding to the application owner providing the service that is embedded in the trusted execution environment (step 608).

The computer, using the secure agent, receives a container runtime interface command to perform an orchestration action on the set of containers comprising an application workload that corresponds to the service from a kubelet located outside the trusted execution environment (step 610). An orchestration action is any action required by the orchestration layer to maintain availability and interconnectivity of the containers which form part of the application workload. For example, but not limited to, starting/stopping of containers, inspecting logs from containers, configuring networking from containers to rest of cluster, attaching storage to the pod sandbox virtual machine and making the storage available to the containers, and the like. Also, it should be noted that the container runtime interface command includes a pull container image command and a generate container command. The computer, using the secure agent, verifies the container runtime interface command to perform the orchestration action on the set of containers comprising the application workload that corresponds to the service based on matching the container runtime interface command to a rule contained in the trusted execution environment contract included in the pod sandbox virtual machine of the trusted execution environment (step 612).

For example, the secure agent can verify a container image name in a pod deployment description against a rule for the container image name in the trusted execution environment contract. If the container image name is valid against the rule for the container image name in the trusted execution environment contract, then the secure agent pulls the container image from the external repository. When the trusted execution environment contract includes a container image signature verification key, the secure agent verifies the container image signature pulled with the container image from the repository using the container image signature verification key. If the container image signature is valid based on the container image signature verification key, then the secure agent successfully completes the pull container image command. Otherwise, the secure agent returns an error when the container image signature is not verified.

The secure agent can verify a container image specification in a command parameter corresponding to a container image previously pulled from the repository and verified as valid. The secure agent also verifies other container parameters, such as, for example, a container environment variable, a container entry command and its parameters, and the like, against a rule defined in the trusted execution environment contract. If all of the container parameters satisfy the rule in the trusted execution contract, then the secure agent generates the container in the trusted execution environment (e.g., pod sandbox virtual machine). The secure agent can use, for example, a secret in the trusted execution environment contract as a key to decrypt an environment variable value in the pod deployment description when the environment variable value is encrypted.

The secure agent can verify whether a rule corresponding to a container image name allows a container image name contained in a pod deployment description. The trusted execution environment contract defines, for example, the rule as a specific container image name or a regular expression describing a container image name pattern. The secure agent can verify a signature of each container image pulled from the repository, along with a container image, itself, using a container signature verification key included in the trusted execution environment contract.

The trusted execution environment contract can also include restrictions on the use of configuration maps, secrets, and persistent volume claims by specific containers in the trusted execution environment. In addition, the trusted execution environment contract can define a rule for environment variables, container command arguments, and persistent volumes to mount for each container and a rule for each persistent volume. Each rule can allow or disallow a specific configuration map, secret, or persistent volume. Further, the trusted execution environment contract can include secrets or keys to decrypt secrets, configuration maps, and persistent volumes. Furthermore, the trusted execution environment contract can include one or more encrypted secrets, which the secure agent can decrypt using a contract decryption key embedded in the trusted execution environment. The secure agent can use those decrypted secrets to decrypt other secrets passed through a pod deployment description, a configuration map, and a persistent volume.

Subsequently, the computer, using the secure agent, makes a determination as to whether the container runtime interface command to perform the orchestration action on the set of containers is valid based finding a matching rule in the trusted execution environment contract (step 614). If the computer, using the secure agent, determines that the container runtime interface command to perform the orchestration action on the set of containers is invalid based not finding a matching rule in the trusted execution environment contract, no output of step 614, then the computer, using the secure agent, returns an error to the kubelet (step 616). Thereafter, the process terminates. If the computer, using the secure agent, determines that the container runtime interface command to perform the orchestration action on the set of containers is valid based on finding a matching rule in the trusted execution environment contract, yes output of step 614, then the computer, using the secure agent, executes the container runtime interface command to perform the orchestration action on the set of containers comprising the application workload that corresponds to the service in the pod sandbox virtual machine of the trusted execution environment (step 618). Afterward, the computer, using the secure agent, returns a result of performing the orchestration action on the set of containers comprising the application workload that corresponds to the service to the kubelet (step 620). Thereafter, the process returns to step 610 where the computer waits to receive another container runtime interface command.

Thus, illustrative embodiments of the present invention provide a computer-implemented method, computer system, and computer program product for increasing pod isolation and security for regulatory compliance in a container orchestration environment while maintaining user experience by only permitting containers that are specified in a pod deployment description and verified against a rule contained in a trusted execution environment contract to run in a trusted execution environment of the container orchestration environment. Furthermore, the illustrative embodiments allow technical separation and protection of the preparation of the trusted execution environment contract and pod deployment description from orchestration of a cluster. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for securing pods in a container orchestration environment, the computer-implemented method comprising:

verifying, by a computer, using an agent embedded in a trusted execution environment of the computer, a container runtime interface command to perform an orchestration action on a set of containers comprising an application workload that corresponds to a service hosted by the container orchestration environment based on matching the container runtime interface command to a rule contained in a trusted execution environment contract included in a pod sandbox virtual machine of the trusted execution environment;

verifying, by the computer, using the agent, a digital signature of the trusted execution environment contract included in the pod sandbox virtual machine with the set of containers that corresponds to the service deployed in the trusted execution environment based on a contract verification key corresponding to an application owner providing the service in the container orchestration environment;

determining, by the computer, using the agent, whether the container runtime interface command to perform the orchestration action on the set of containers is valid based finding a matching rule in the trusted execution environment contract; and responsive to the computer determining, using the agent, that the container runtime interface command to perform the orchestration action on the set of containers is valid based on finding the matching rule in the trusted execution environment contract, executing, by the computer, using the agent, the container runtime interface command to perform the orchestration action on the set of containers comprising the application workload that corresponds to the service in the pod sandbox virtual machine of the trusted execution environment.

2. The computer-implemented method of claim 1 further comprising:

returning, by the computer, using the agent, a result of performing the orchestration action on the set of containers comprising the application workload that corresponds to the service.

3. The computer-implemented method of claim 1 further comprising:

determining, by the computer, using the agent, whether the digital signature of the trusted execution environment contract is valid based on the contract verification key; and responsive to the computer determining, using the agent, that the digital signature of the trusted execution environment contract is valid based on the contract verification key, decrypting, by the computer, using the agent, the trusted execution environment contract based on a contract decryption key corresponding to the application owner providing the service that is embedded in the trusted execution environment.

4. The computer-implemented method of claim 1 further comprising:

receiving, by the computer, an input to deploy the pod sandbox virtual machine with the set of containers that corresponds to the service into the trusted execution environment of the container orchestration environment from a client device corresponding to an administrator of the container orchestration environment; and responsive to receiving the input to deploy the pod sandbox virtual machine with the set of containers into the trusted execution environment, retrieving, by the computer, the trusted execution environment contract and a pod deployment description from a client device corresponding to an application owner providing the service in the container orchestration environment and retrieving, by the computer, a pod sandbox virtual machine image corresponding to the pod sandbox virtual machine for the service from an image repository.

5. The computer-implemented method of claim 4 further comprising:

generating, by the computer, the pod sandbox virtual machine for the service based on the pod sandbox virtual machine image; and inserting, by the computer, the trusted execution environment contract in the pod sandbox virtual machine for the service.

6. The computer-implemented method of claim 1 further comprising:

directing, by the computer, the agent to pull a corresponding container image for each respective container in the set of containers that corresponds to the service to be included in the pod sandbox virtual machine from an image repository; and directing, by the computer, the agent to generate each respective container in the set of containers that corresponds to the service in the pod sandbox virtual machine using the corresponding container image pulled from the image repository.

7. The computer-implemented method of claim 6, wherein the agent verifies authenticity of the corresponding container image for each respective container in the set of containers to prevent an attempt to pull a different container image in at runtime using a corresponding public key contained in the trusted execution environment contract to validate a signature associated with an image pulled from the image repository, and wherein the agent verifies that an encrypted image can be decrypted correctly using a decryption key from one of the trusted execution environment contract or another source.

8. The computer-implemented method of claim 1 further comprising:

deploying, by the computer, using the agent, the pod sandbox virtual machine that includes the trusted execution environment contract and the set of containers that corresponds to the service in the trusted execution environment based on a pod deployment description that is created by an application owner that provides the service in the container orchestration environment, wherein a portion of the pod deployment description and the trusted execution environment contract is encrypted using a public key corresponding to the application owner, and wherein the agent decrypts encrypted portions of the pod deployment description and the trusted execution environment contract using a corresponding private key located inside the trusted execution environment.

9. The computer-implemented method of claim 1, wherein the trusted execution environment provides isolated and secure execution of the set of containers in the pod sandbox virtual machine corresponding to the service, and wherein the trusted execution environment includes a secure portion of a memory and a secure portion of a processor coupled to the computer.

10. The computer-implemented method of claim 1, wherein the trusted execution environment contract includes at least one of signatures of containers, restrictions on the containers, secrets, or cryptographic keys, wherein the signatures correspond to the set of containers that are permitted to run in the trusted execution environment, and wherein the restrictions on the containers define which containers in the set of containers can gain access to at least one of configuration maps, secrets, or persistent volume claims that describe how a container consumes a persistent volume, and wherein the secrets or cryptographic keys are used inside the trusted execution environment to decrypt at least one of secrets, configuration maps, or persistent volumes that are provided to the trusted execution environment.

11. A computer system for securing pods in a container orchestration environment, the computer system comprising:

a bus system;

a storage device connected to the bus system, wherein the storage device stores program instructions; and a processor connected to the bus system, wherein the processor executes the program instructions to:

verify, using an agent embedded in a trusted execution environment of the computer system, a container runtime interface command to perform an orchestration action on a set of containers comprising an application workload that corresponds to a service hosted by the container orchestration environment based on matching the container runtime interface command to a rule contained in a trusted execution environment contract included in a pod sandbox virtual machine of the trusted execution environment;

verify, using the agent, a digital signature of the trusted execution environment contract included in the pod sandbox virtual machine with the set of containers that corresponds to the service deployed in the trusted execution environment based on a contract verification key corresponding to an application owner providing the service in the container orchestration environment;

determine, using the agent, whether the container runtime interface command to perform the orchestration action on the set of containers is valid based finding a matching rule in the trusted execution environment contract; and execute, using the agent, the container runtime interface command to perform the orchestration action on the set of containers comprising the application workload that corresponds to the service in the pod sandbox virtual machine of the trusted execution environment in response to determining, using the agent, that the container runtime interface command to perform the orchestration action on the set of containers is valid based on finding the matching rule in the trusted execution environment contract.

12. The computer system of claim 11, wherein the processor further executes the program instructions to:
return, using the agent, a result of performing the orchestration action on the set of containers comprising the application workload that corresponds to the service.

13. The computer system of claim 11, wherein the processor further executes the program instructions to:
determine, using the agent, whether the digital signature of the trusted execution environment contract is valid based on the contract verification key; and
decrypt, using the agent, the trusted execution environment contract based on a contract decryption key corresponding to the application owner providing the service that is embedded in the trusted execution environment in response to determining, using the agent, that the digital signature of the trusted execution environment contract is valid based on the contract verification key.

14. The computer system of claim 11, wherein the processor further executes the program instructions to:
receive an input to deploy the pod sandbox virtual machine with the set of containers that corresponds to the service into the trusted execution environment of the container orchestration environment from a client device corresponding to an administrator of the container orchestration environment; and
retrieve the trusted execution environment contract and a pod deployment description from a client device corresponding to an application owner providing the service in the container orchestration environment and retrieve a pod sandbox virtual machine image corresponding to the pod sandbox virtual machine for the service from an image repository in response to receiving the input to deploy the pod sandbox virtual machine with the set of containers into the trusted execution environment.

15. The computer system of claim 14, wherein the processor further executes the program instructions to:
generate the pod sandbox virtual machine for the service based on the pod sandbox virtual machine image; and
insert the trusted execution environment contract in the pod sandbox virtual machine for the service.

16. A computer program product for securing pods in a container orchestration environment, the computer program product comprising a computer-readable storage medium having program instructions embodied therewith, the program instructions executable by a computer to cause the computer to perform a method of:
verifying, by the computer, using an agent embedded in a trusted execution environment of the computer, a container runtime interface command to perform an orchestration action on a set of containers comprising an application workload that corresponds to a service hosted by the container orchestration environment based on matching the container runtime interface command to a rule contained in a trusted execution environment contract included in a pod sandbox virtual machine of the trusted execution environment;
verifying, by the computer, using the agent, a digital signature of the trusted execution environment contract included in the pod sandbox virtual machine with the set of containers that corresponds to the service deployed in the trusted execution environment based on a contract verification key corresponding to an application owner providing the service in the container orchestration environment;
determining, by the computer, using the agent, whether the container runtime interface command to perform the orchestration action on the set of containers is valid based finding a matching rule in the trusted execution environment contract; and
responsive to the computer determining, using the agent, that the container runtime interface command to perform the orchestration action on the set of containers is valid based on finding the matching rule in the trusted execution environment contract, executing, by the computer, using the agent, the container runtime interface command to perform the orchestration action on the set of containers comprising the application workload that corresponds to the service in the pod sandbox virtual machine of the trusted execution environment.

17. The computer program product of claim 16 further comprising:
returning, by the computer, using the agent, a result of performing the orchestration action on the set of containers comprising the application workload that corresponds to the service.

18. The computer program product of claim 16 further comprising:
determining, by the computer, using the agent, whether the digital signature of the trusted execution environment contract is valid based on the contract verification key; and
responsive to the computer determining, using the agent, that the digital signature of the trusted execution environment contract is valid based on the contract verification key, decrypting, by the computer, using the agent, the trusted execution environment contract based on a contract decryption key corresponding to the application owner providing the service that is embedded in the trusted execution environment.

19. The computer program product of claim 16 further comprising:
receiving, by the computer, an input to deploy the pod sandbox virtual machine with the set of containers that corresponds to the service into the trusted execution environment of the container orchestration environment from a client device corresponding to an administrator of the container orchestration environment; and
responsive to receiving the input to deploy the pod sandbox virtual machine with the set of containers into the trusted execution environment, retrieving, by the computer, the trusted execution environment contract and a pod deployment description from a client device corresponding to an application owner providing the service in the container orchestration environment and retrieving, by the computer, a pod sandbox virtual machine image corresponding to the pod sandbox virtual machine for the service from an image repository.

20. The computer program product of claim 19 further comprising:
generating, by the computer, the pod sandbox virtual machine for the service based on the pod sandbox virtual machine image; and
inserting, by the computer, the trusted execution environment contract in the pod sandbox virtual machine for the service.

21. A method for securing pods, the method comprising:
verifying a container runtime interface command to perform an orchestration action on a set of containers comprising an application workload that corresponds to a service based on matching the container runtime interface command to a rule contained in a trusted execution environment contract included in a pod sandbox virtual machine of a trusted execution environment;
verifying a digital signature of the trusted execution environment contract included in the pod sandbox virtual machine with the set of containers that corresponds to the service deployed in the trusted execution environment based on a contract verification key corresponding to an application owner providing the service;
determining whether the container runtime interface command to perform the orchestration action on the set of containers is valid based finding a matching rule in the trusted execution environment contract; and
responsive to determining that the container runtime interface command to perform the orchestration action on the set of containers is valid based on finding the matching rule in the trusted execution environment contract, executing the container runtime interface command to perform the orchestration action on the set of containers comprising the application workload that corresponds to the service in the pod sandbox virtual machine of the trusted execution environment.

22. The method of claim 21 further comprising:
returning a result of performing the orchestration action on the set of containers.

* * * * *